(12) United States Patent
Ma et al.

(10) Patent No.: US 12,418,611 B2
(45) Date of Patent: Sep. 16, 2025

(54) INFORMATION DISPLAY METHOD AND COMPUTER-READABLE STORAGE MEDIUM

(71) Applicant: GOERTEK INC., Weifang (CN)

(72) Inventors: Dongmei Ma, Weifang (CN); Haihong Zhang, Weifang (CN)

(73) Assignee: GOERTEK INC., Weifang (CN)

( * ) Notice: Subject to any disclaimer, the term of this patent is extended or adjusted under 35 U.S.C. 154(b) by 0 days.

(21) Appl. No.: 18/735,355

(22) Filed: Jun. 6, 2024

(65) Prior Publication Data

US 2024/0323273 A1   Sep. 26, 2024

Related U.S. Application Data

(63) Continuation of application No. PCT/CN2022/102165, filed on Jun. 29, 2022.

(30) Foreign Application Priority Data

Mar. 29, 2022 (CN) .......................... 202210320708.X

(51) Int. Cl.
*H04M 1/72412* (2021.01)
*G06F 3/14* (2006.01)
(Continued)

(52) U.S. Cl.
CPC .......... *H04M 1/72412* (2021.01); *G06F 3/14* (2013.01); *H04M 1/72484* (2021.01); *H04W 4/80* (2018.02)

(58) Field of Classification Search
CPC ......... H04M 1/72412; H04M 1/72484; H04M 1/7243; G06F 3/14; H04W 4/80; Y02D 30/70; H04R 1/10; H04R 3/00
See application file for complete search history.

(56) References Cited

U.S. PATENT DOCUMENTS

2001/0005197 A1*  6/2001  Mishra ............... H04N 7/17318
                                              348/E5.103
2002/0057810 A1*  5/2002  Boesen ............... H04M 1/6033
                                              381/151
(Continued)

FOREIGN PATENT DOCUMENTS

CN       108184209 A      6/2018
CN       111031433 A      4/2020
(Continued)

OTHER PUBLICATIONS

International Search Report and Written Opinion in Corresponding International Application No. PCT/CN2022/102165, mailed Oct. 25, 2022; 10 pgs.
(Continued)

*Primary Examiner* — Dmitriy Bolotin
(74) *Attorney, Agent, or Firm* — HAUPTMAN HAM, LLP

(57) ABSTRACT

Disclosed are an information display method and a computer-readable storage medium. The method is applied to a headset device, the headset device communicates with a user terminal and a head-mounted device respectively through a Bluetooth multi-point connection function, and the method includes: receiving information to be displayed sent by the user terminal, where the information to be displayed is generated by the user terminal when it detects that information needs to be displayed in the headset device and is sent to the headset device; and sending the information to be displayed to the head-mounted device, to make the head-mounted device output and display the information to be displayed.

11 Claims, 5 Drawing Sheets

(51) Int. Cl.
*H04M 1/72484* (2021.01)
*H04W 4/80* (2018.01)

(56) References Cited

U.S. PATENT DOCUMENTS

| | | | | |
|---|---|---|---|---|
| 2002/0196955 A1* | 12/2002 | Boesen | ............ | H04M 1/05 |
| | | | | 381/326 |
| 2003/0065504 A1* | 4/2003 | Kraemer | ............ | G06F 40/58 |
| | | | | 704/8 |
| 2003/0100331 A1* | 5/2003 | Dress | ............ | H03J 1/0091 |
| | | | | 455/41.1 |
| 2003/0125081 A1* | 7/2003 | Boesen | ............ | H04M 1/6066 |
| | | | | 455/556.1 |
| 2007/0220108 A1* | 9/2007 | Whitaker | ............ | H04M 1/6041 |
| | | | | 709/217 |
| 2009/0186580 A1 | 7/2009 | Kim | | |
| 2014/0266988 A1* | 9/2014 | Fisher | ............ | G06F 3/04886 |
| | | | | 345/8 |
| 2015/0244848 A1* | 8/2015 | Park | ............ | G06F 3/04847 |
| | | | | 455/412.2 |
| 2017/0108918 A1* | 4/2017 | Boesen | ............ | H04R 1/1016 |
| 2018/0206188 A1* | 7/2018 | Nam | ............ | H04W 52/0229 |

FOREIGN PATENT DOCUMENTS

| | | |
|---|---|---|
| CN | 111683358 A | 9/2020 |
| CN | 111698373 A | 9/2020 |
| CN | 111935689 A | 11/2020 |
| CN | 114205546 A | 3/2022 |

OTHER PUBLICATIONS

First Office Action in Corresponding Chinese Application No. 202210320708.X, dated Sep. 30, 2024; 14 pgs.

* cited by examiner

INFORMATION DISPLAY METHOD AND COMPUTER-READABLE STORAGE MEDIUM

CROSS-REFERENCE TO RELATED APPLICATIONS

This application is a continuation application of International Application No. PCT/CN2022/102165, filed on Jun. 29, 2022, which claims priority to Chinese Patent Application No. 202210320708.X, filed on Mar. 29, 2022. The disclosures of the above-mentioned applications are incorporated herein by reference in their entireties.

TECHNICAL FIELD

The present application relates to the technical field of earphones, and in particular, to an information display method and a computer-readable storage medium.

BACKGROUND

Nowadays, head-mounted device technologies such as virtual reality (VR) and augmented reality (AR) are developing faster and faster, and developers are committed to improving the user experience of head-mounted devices from all aspects. The open sound field of head-mounted devices will prevent users from having a good sense of immersion, so using earphones with head-mounted devices is a technological trend. However, when a user wears earphones and uses a head-mounted device, because the user is always paying attention to the display screen of the head-mounted device, it will be difficult to notice the display information such as the incoming call notification on the mobile phone. In particular, VR headset users cannot see the external environment, thus missing important events on the mobile phone, giving users a poor experience.

SUMMARY

The main objective of the present application is to provide an information display method and a computer-readable storage medium, which aims to solve the problem that when the user wears earphones and uses a head-mounted device, it will be difficult to notice the display information such as the incoming call notification on the mobile phone, thus missing important events on the mobile phone.

In order to achieve the above objective, the present application provides an information display method, applied to a headset device, the headset device communicates with a user terminal and a head-mounted device respectively through a Bluetooth multi-point connection function, and the method includes:

receiving information to be displayed sent by the user terminal, where the information to be displayed is generated by the user terminal when it detects that information needs to be displayed in the headset device and is sent to the headset device; and sending the information to be displayed to the head-mounted device, to make the head-mounted device output and display the information to be displayed.

In an embodiment, after sending the information to be displayed to the head-mounted device, the information display method further includes:

in response to detecting a first feedback instruction for the information to be displayed triggered in the headset device, sending the first feedback instruction to the user terminal, to make the user terminal respond to the first feedback instruction.

In an embodiment, after sending the information to be displayed to the head-mounted device, the information display method further includes:

in response to receiving a second feedback instruction sent by the head-mounted device, forwarding the second feedback instruction to the user terminal, to make the user terminal respond to the second feedback instruction, wherein the second feedback instruction is a feedback instruction for the information to be displayed that is triggered in the head-mounted device upon detection by the head-mounted device.

In an embodiment, after sending the information to be displayed to the head-mounted device, the information display method further includes:

in response to detecting a tapping operation on a housing of the headset device, triggering a third feedback instruction for the information to be displayed; and sending the third feedback instruction to the head-mounted device, so that the head-mounted device responds to the third feedback instruction to perform an operation of stopping displaying the information to be displayed or to perform a page turning operation for the information to be displayed.

In order to achieve the above objective, the present application further provides an information display method, the method is applied to a head-mounted device, a headset device communicates with a user terminal and the head-mounted device respectively through a Bluetooth multi-point connection function, and the method includes:

receiving information to be displayed sent by the headset device, wherein the information to be displayed is generated by the user terminal when it detects that information needs to be displayed in the headset device and is sent to the headset device; and outputting and displaying the information to be displayed.

In an embodiment, after outputting and displaying the information to be displayed, the information display method further includes:

in response to detecting a second feedback instruction for the information to be displayed triggered in the head-mounted device, sending the second feedback instruction to the headset device, to make the user terminal respond to the second feedback instruction forwarded by the headset device.

In order to achieve the above objective, the present application further provides an information display method, the method is applied to a user terminal, a headset device communicates with the user terminal and a head-mounted device respectively through a Bluetooth multi-point connection function, and the method includes:

in response to detecting that information needs to be displayed in the head-mounted device, generating information to be displayed; and sending the information to be displayed to the headset device, to make the headset device output the information to be displayed after the headset device sends the information to be displayed to the head-mounted device.

In an embodiment, the in response to detecting that information needs to be displayed in the head-mounted device, generating information to be displayed includes:

in response to detecting an incoming call event, obtaining an incoming call number of the incoming call event;

checking whether the incoming call number is recorded in an address book of the user terminal;

in response to that the incoming call number is recorded in the address book, obtaining remark information corresponding to the incoming call number from the address book, and generating the information to be displayed based on the remark information; or in response to that the incoming call number is not recorded in the address book, generating the information to be displayed based on the incoming call number.

In an embodiment, before obtaining the remark information corresponding to the incoming call number from the address book, and generating the information to be displayed based on the remark information, the information display method further includes:

in response to that the incoming call number is recorded in the address book, determining whether the incoming call number is an important number marked in the address book;

in response to that the incoming call number is the important number marked in the address book, obtaining the remark information corresponding to the incoming call number from the address book, and generating the information to be displayed based on the remark information.

In order to achieve the above objective, the present application further provides an information display device, including a memory, a processor and an information display program store in the memory and executable on the processor, when the information display program is executed by the processor, the information display method as described above is implemented.

In order to achieve the above objective, the present application further provides a computer-readable storage medium, an information display program is stored in the computer-readable storage medium, and when the information display program is executed by a processor, the information display method as described above is implemented.

In the present application, the headset device performs Bluetooth communication with the user terminal and the head-mounted device respectively based on the Bluetooth multi-point connection function. When the user terminal detects that information needs to be displayed in the head-mounted device, it generates the information to be displayed and sends it to the headset device. The headset device receives the information to be displayed sent by the user terminal and sends the information to be displayed to the headset device, such that the head-mounted device will output and display the information to be displayed, and then the user wears earphones and uses the head-mounted device, it can also forward the information in the user terminal to the head-mounted device for display through the headset, preventing the user from missing important events on the user terminal and improving the user experience when wearing the headset and using the head-mounted device.

The realization of the purpose, functional features and advantages of the present application will be further described with reference to the embodiments and the accompanying drawings.

DETAILED DESCRIPTION OF THE EMBODIMENTS

It should be understood that the specific embodiments described herein are only used to explain the present application and are not intended to limit the present application.

Figure 1:
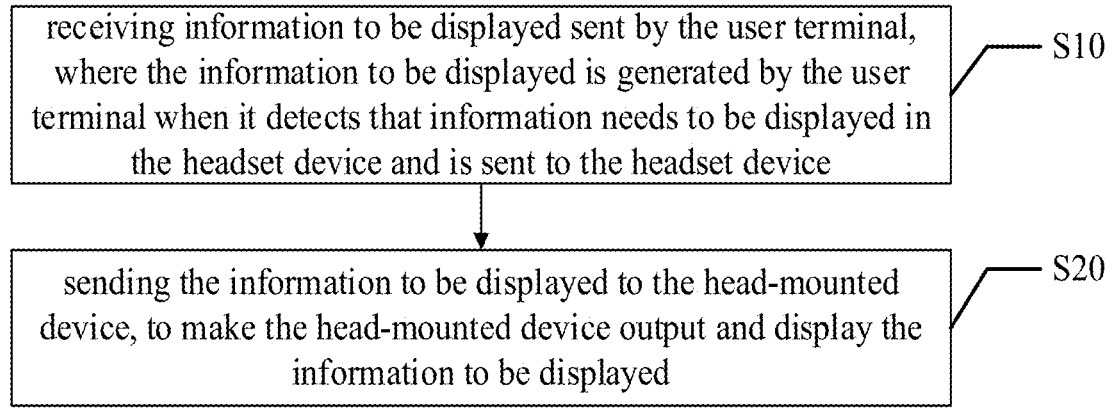
FIG. 1 is a schematic flowchart of an information display method according to an embodiment of the present application.

As shown in FIG. 1, FIG. 1 is a schematic flowchart of an information display method according to an embodiment of the present application.

The embodiment of the present application provides an example of an information display method. It should be noted that although a logical sequence is shown in the flowcharts, in some cases the steps shown or described can be performed in a sequence different from that herein. In this embodiment, the information display method is applied to a headset device. The headset device can include one earphone or two earphones. When the headset device includes two earphones, the information display method can be applied to any one of the earphones. In this embodiment, the information display method includes:

Step S10, receiving information to be displayed sent by the user terminal. The information to be displayed is generated by the user terminal when it detects that information needs to be displayed in the headset device and is sent to the headset device.

In this embodiment, the headset device can communicate with the user terminal and the head-mounted device respectively through the Bluetooth multi-point connection function. The user terminal can be a user terminal device such as a smartphone or a personal computer, and the head-mounted device can be a device with a display device for users to wear on their heads, such as virtual reality (VR) device, augmented reality (AR) device, etc. The Bluetooth multi-point connection function is a function configured in the headset device that can establish Bluetooth communication with multiple devices. This function can be implemented based on Bluetooth multi-point connection technology and will not be described in this embodiment. In an embodiment, the headset device can be connected to the user terminal and the head-mounted device using different Bluetooth links respectively. For example, the headset device is connected to the user terminal based on SPP (Serial Port Profile, Bluetooth serial port) link, and connected to the head-mounted device based on BLE (Bluetooth low energy) link.

In an embodiment, users can use their own headset devices to connect their own user terminals and head-mounted devices at the same time. The headset device obtains the audio data in the user terminal through the Bluetooth connection link with the user terminal for playback, or can also obtain the audio data in the head-mounted device through the Bluetooth connection link with the head-mounted device for playback.

In order to facilitate the user to conveniently obtain information in the user terminal when wearing the head-mounted device, in this embodiment, the headset device can be used as a relay party to transfer the information to be displayed in the user terminal to the head-mounted device for display.

In an embodiment, when the user terminal detects that information needs to be displayed in the headset device, it can generate information to be displayed and send it to the headset device. The information that needs to be displayed in the head-mounted device refers to the information that needs to be displayed in the head-mounted device, and the information to be displayed is the information that needs to be displayed in the head-mounted device. In specific implementations, there are many ways of how the user terminal detects information that needs to be displayed in the head-mounted device and how to generate the information to be displayed, which are not limited here. For example, in an embodiment, the user terminal can pre-define trigger events that represent information that needs to be displayed in the head-mounted device, and the type of information that needs to be displayed when the trigger event occurs. When the trigger event occurs, it means that the corresponding type of information needs to be displayed on the head-mounted device. That is, when the trigger event occurs, the user terminal generates the corresponding type of information to be displayed and sends it to the headset device. The trigger event, that is, the type of information that needs to be displayed, can be preset in the user terminal as needed. For example, the preset incoming call event is used as the trigger event and the incoming call number of the preset incoming call event is used as the type of information that needs to be displayed. Another example is the preset SMS notification event is used as the trigger event and the preset SMS content is used as the type of information that needs to be displayed. Alternatively, the trigger event and the type of information that needs to be displayed can also be customized by the user in the user terminal. For example, in an embodiment, a trigger event selection list can be set in the user terminal. The list includes each event that can be set as a trigger event and the information type that can be displayed for each event, and sets an approach for the user to select the trigger event and information type from the trigger event selection list, such as voice control approach or user interface-based operation approach. Users can select the corresponding event as the trigger event and select the corresponding information type according to their own needs. For example, if the user deems it necessary to display the incoming call number of the incoming call event on the head-mounted device when there is an incoming call event in the user terminal, the user can select the incoming call event as the trigger event and the incoming call number as the type of information that needs to be displayed.

Step S20, sending the information to be displayed to the head-mounted device, to make the head-mounted device output and display the information to be displayed.

The headset device receives the information to be displayed sent by the user terminal, and sends the information to be displayed to the head-mounted device to implement the relay function of the information to be displayed. After receiving the information to be displayed, the head-mounted device can output and display the information to be displayed. Specifically, the head-mounted device can output and display the information to be displayed in the display device of the head-mounted device. For example, when the head-mounted device is a VR device, the information to be displayed can be displayed in the VR display screen. In a specific implementation, the head-mounted device can pause the display of the currently displayed content, and then output and display the information to be displayed, or it can display the information to be displayed in a pop-up window on the currently displayed content. The specific display method is not limited in this embodiment.

In this embodiment, the headset device performs Bluetooth communication with the user terminal and the head-mounted device respectively based on the Bluetooth multi-point connection function. When the user terminal detects that information needs to be displayed in the head-mounted device, it generates the information to be displayed and sends it to the headset device. The headset device receives the information to be displayed sent by the user terminal and sends the information to be displayed to the headset device, such that the head-mounted device will output and display the information to be displayed, and then the user wears earphones and uses the head-mounted device, it can also forward the information in the user terminal to the head-mounted device for display through the headset, preventing the user from missing important events on the user terminal and improving the user experience when wearing the headset and using the head-mounted device.

Further, in an embodiment, after the head-mounted device outputs and displays the information to be displayed, it can stop displaying the information to be displayed after detecting an instruction to stop displaying the information to be displayed. The instruction to stop displaying the information to be displayed can be triggered in the head-mounted device, or can be triggered in the headset device and then sent by the headset device to the head-mounted device, or can be triggered in the user terminal and then sent by the user terminal to the headset device and then sent by the headset device to the head-mounted device. For example, in an embodiment, the user can trigger the instruction to stop displaying the information to be displayed by operating on the head-mounted device, the headset device or the user terminal, for example, operating a physical button or touch button in the head-mounted device, the headset device or the user terminal to trigger the instruction. For another example, in an embodiment, the head-mounted device can be configured to automatically trigger an instruction to stop displaying the information to be displayed after displaying the information to be displayed for a period of time.

Figure 2:
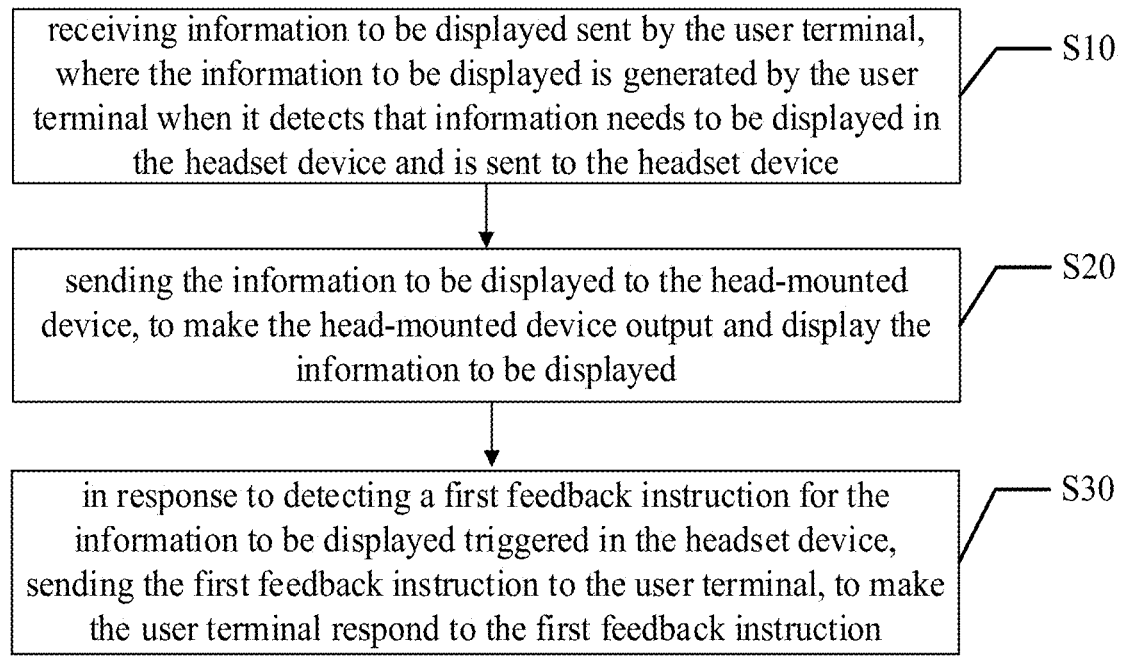
FIG. 2 is a schematic flowchart of an information display method according to an embodiment of the present application.

Further, in an embodiment, after the step S20, as shown in FIG. 2, the information display method further includes:

Step S30, in response to detecting a first feedback instruction for the information to be displayed triggered in the headset device, sending the first feedback instruction to the user terminal, to make the user terminal respond to the first feedback instruction.

After the headset device sends the information to be displayed to the head-mounted device, the headset device can detect whether there is a feedback instruction triggered by the user in the headset device (hereinafter referred to as the first feedback instruction). The user can trigger the first feedback instruction for the information to be displayed by operating the physical buttons or touch buttons in the headset device or other interactive methods. The first feedback instruction is configured to instruct the user terminal to perform corresponding operations. In a specific implementation, for a type of information to be displayed, the type of first feedback instruction that can be triggered by different operations in the headset device can be preset. Then, when the user performs a feedback operation in the headset device, the headset device can generate a corresponding type of first feedback instruction based on the feedback operation and the type of information to be displayed.

After detecting that the user triggers the first feedback instruction for the information to be displayed in the headset device, the headset device sends the first feedback instruction to the user terminal, such that the user terminal responds to the first feedback instruction, that is, performs a preset operation corresponding to the first feedback instruction. In a specific implementation, for a type of first feedback instruction, the operations that the user terminal needs to perform when receiving the first feedback instruction of this type can be preset in the user terminal. Then, after the user terminal receives the first feedback instruction, it can perform the operation corresponding to the first feedback instruction.

For example, when the information to be displayed is the display information generated when an incoming call event occurs in the user terminal, the first feedback instruction can be an operation for instructing the user terminal to hang up the phone, or an operation for instructing the user terminal to connect the phone.

In this embodiment, when the headset device detects the first feedback instruction for the information to be displayed triggered in the headset device, the first feedback instruction is sent to the user terminal for the user terminal to respond to the first feedback instruction, such that when a user wears earphones and uses a head-mounted device, the user can perform corresponding operations on the user terminal without taking off the head-mounted device, thereby improving the user experience of using the head-mounted device.

Figure 3:
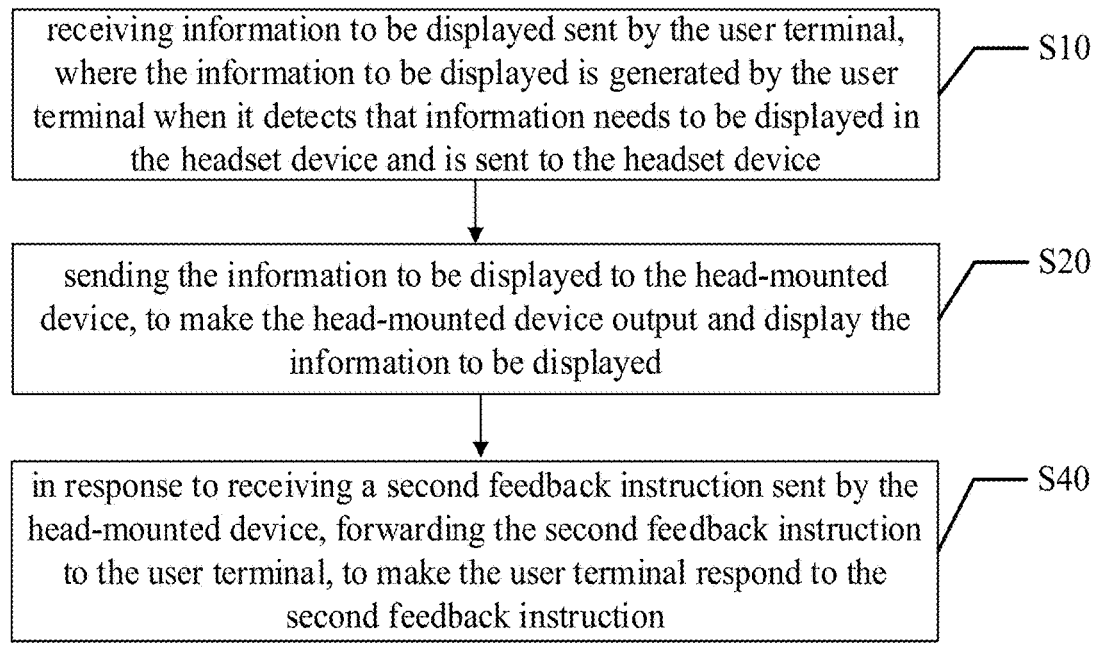
FIG. 3 is a schematic flowchart of an information display method according to an embodiment of the present application.

Further, in an embodiment, after the step S20, as shown in FIG. 3, the method further includes:

Step S40, in response to receiving a second feedback instruction sent by the head-mounted device, forwarding the second feedback instruction to the user terminal, to make the user terminal respond to the second feedback instruction. The second feedback instruction is a feedback instruction for the information to be displayed that is triggered in the head-mounted device upon detection by the head-mounted device.

After the headset device sends the information to be displayed to the head-mounted device, if the headset device receives the feedback instruction sent by the head-mounted device (hereinafter referred to as the second feedback instruction), it forwards the second feedback instruction to the user terminal, so that the user terminal responds to the second feedback instruction.

After the head-mounted device outputs and displays the information to be displayed, it can detect whether there is a second feedback instruction triggered by the user in the head-mounted device. The user can trigger the second feedback instruction for the information to be displayed by operating physical buttons or touch buttons in the head-mounted device or other interactive methods. The second feedback instruction is configured to instruct the user terminal to perform corresponding operations. In a specific implementation, for a type of information to be displayed, the type of second feedback instruction that can be triggered by different operations in the head-mounted device can be preset. Then, when the user performs a feedback operation in the head-mounted device, the head-mounted device can generate a corresponding type of first feedback instruction based on the feedback operation and the type of information to be displayed.

After the head-mounted device detects that the user triggers a second feedback instruction for the information to be displayed in the head-mounted device, it sends the second feedback instruction to the headset device, such that after the headset device forwards the second feedback instruction to the user terminal, the user terminal responds to the second feedback instruction, that is, performs a preset operation corresponding to the second feedback instruction. In a specific implementation, for a type of second feedback instruction, the operations that the user terminal needs to perform when receiving the second feedback instruction of this type can be preset in the user terminal. Then, after receiving the second feedback instruction, the user terminal can perform the operation corresponding to the second feedback instruction.

For example, when the information to be displayed is the display information generated when the SMS notification event occurs in the user terminal, the second feedback instruction can be an operation for instructing the user terminal to set the received text message as read information, or an operation for instructing the user terminal to reply to a text message with specified content.

In this embodiment, when the head-mounted device detects the second feedback instruction for the information to be displayed triggered in the head-mounted device, the second feedback instruction is sent to the headset device, and the headset device forwards it to the user terminal, so that the user terminal responds to the second feedback instruction, which enables the user to perform corresponding operations on the user terminal without taking off the head-mounted device when wearing earphones and using the head-mounted device, thereby improving the user experience of using the head-mounted device.

Figure 4:
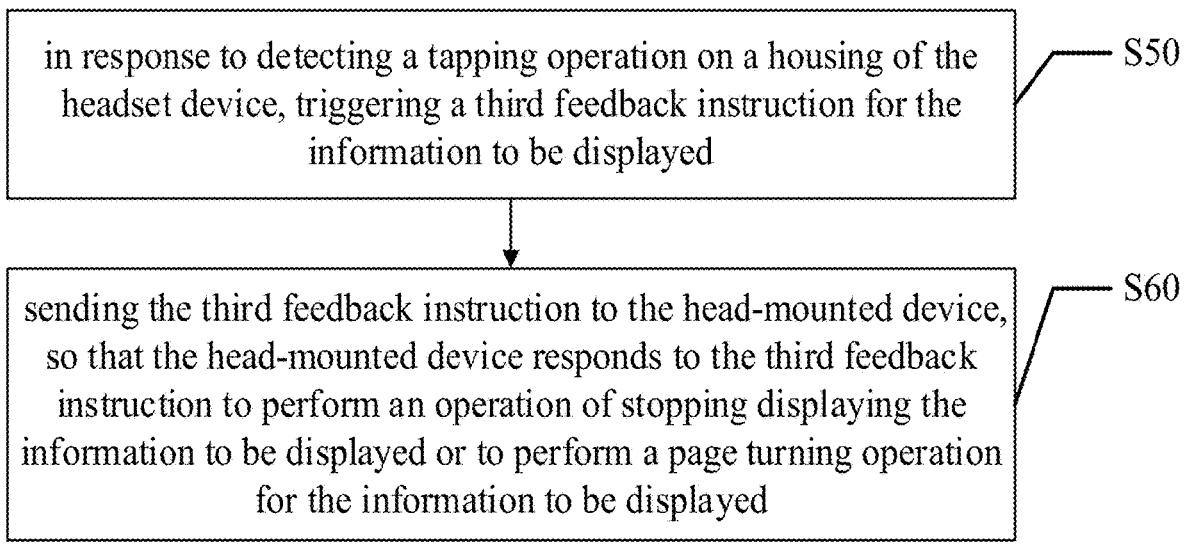
FIG. 4 is a schematic flowchart of an information display method according to an embodiment of the present application.

Further, in an embodiment, after the step S20, as shown in FIG. 4, the information display method further includes:

Step S50, in response to detecting a tapping operation on a housing of the headset device, triggering a third feedback instruction for the information to be displayed; and Step S60, sending the third feedback instruction to the head-mounted device, so that the head-mounted device responds to the third feedback instruction to perform an operation of stopping displaying the information to be displayed or to perform a page turning operation for the information to be displayed.

In this embodiment, after the headset device sends the information to be displayed to the head-mounted device, it can detect whether there is a tapping operation on the housing of the headset device. If a tapping operation is detected, a feedback instruction for the information to be displayed (hereinafter referred to as the third feedback instruction) is triggered. A touch sensor can be embedded in the housing of the headset device. When the user taps the housing of the headset device, the user's operation is determined to be a touch operation based on the data detected by the touch sensor. The headset device can send the third feedback instruction to the head-mounted device. It can be defined in advance that the third feedback instruction triggered by the tapping operation is an instruction for instructing to stop displaying the information to be displayed or an instruction for performing page turning for the information to be displayed. After receiving the third feedback instruction, the head-mounted device performs an operation of stopping displaying the information to be displayed or performing a page turning operation for the information to be displayed according to the instructions of the third feedback instruction. In an implementation, when a pop-up window is used to display the information to be displayed in the head-mounted device, if a part of the information to be displayed is displayed in the pop-up window, after receiving the third feedback command, a page turning operation can be performed to display the remaining part of the information to be displayed. If all the information to be displayed has been displayed in the pop-up window, after receiving the third feedback instruction, the operation of stopping displaying the information to be displayed can be performed.

In this embodiment, when the headset device detects a tapping operation on the housing of the headset device, the third feedback instruction is triggered and sent to the head-mounted device, such that the head-mounted device responds to the third feedback instruction to perform an operation of stopping displaying the information to be displayed or to perform a page turning operation for the information to be displayed, such that when a user wears earphones and uses a head-mounted device, the user can easily operate the information in the user terminal displayed in the head-mounted device by tapping the housing of the headset device, which improves the convenience of user operations, thus improving the user experience.

Figure 5:
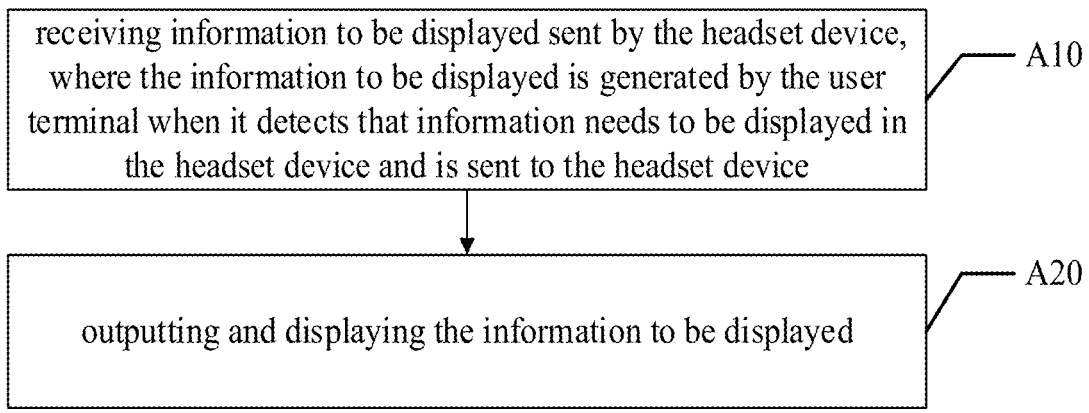
FIG. 5 is a schematic flowchart of an information display method according to an embodiment of the present application.

Further, based on the above embodiment, the present application provides another embodiment of the information display method. As shown in FIG. 5, FIG. 5 is a schematic flowchart of an information display method according to another embodiment of the present application. In this embodiment, the information display method is applied to a head-mounted device, a headset device communicates with a user terminal and the head-mounted device respectively through a Bluetooth multi-point connection function, and the method includes the following steps:

Step A10, receiving information to be displayed sent by the headset device, where the information to be displayed is generated by the user terminal when it detects that information needs to be displayed in the headset device and is sent to the headset device; and Step A20, outputting and displaying the information to be displayed.

In this embodiment, for the specific implementation of steps A10-A20, reference can be made to the specific implementation of steps S10-S20 in the above-mentioned embodiment, and will not be repeated here.

Figure 6:
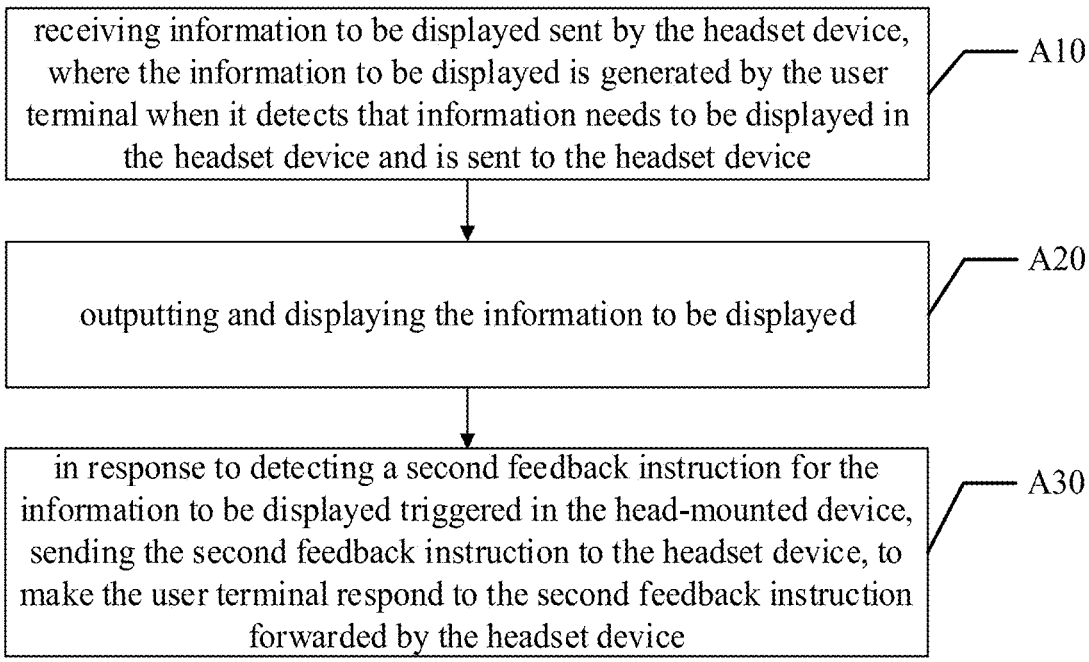
FIG. 6 is a schematic flowchart of an information display method according to an embodiment of the present application.

Further, in an embodiment, after the step A20, as shown in FIG. 6, the information display method further includes:

Step A30, in response to detecting a second feedback instruction for the information to be displayed triggered in the head-mounted device, sending the second feedback instruction to the headset device, to make the user terminal respond to the second feedback instruction forwarded by the headset device.

For the specific implementation of step A30 in this embodiment, reference can be made to the specific implementation of step S40 in the above-mentioned embodiment, and will not be repeated here.

Figure 7:
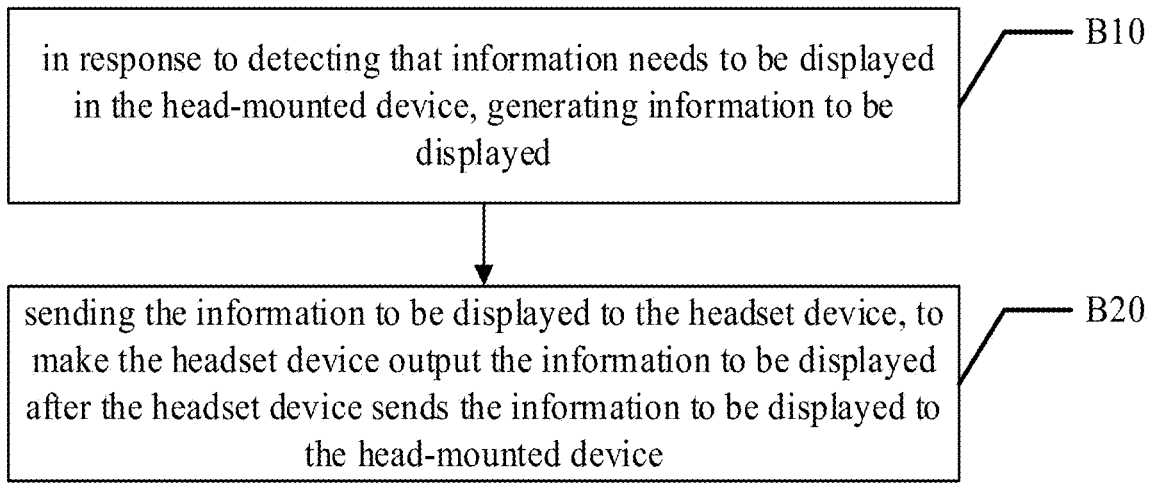
FIG. 7 is a schematic flowchart of an information display method according to another embodiment of the present application.

Further, based on the above-mentioned embodiments, the present application provides another embodiment of the information display method. As shown in FIG. 7, FIG. 7 is a schematic flowchart of an information display method according to another embodiment of the present application. In this embodiment, the information display method is applied to a user terminal, and the user terminal can be a user terminal device such as a smartphone or a personal computer. A headset device communicates with the user terminal and a head-mounted device respectively through a Bluetooth multi-point connection function, and the information display method includes the following steps:

Step B10, in response to detecting that information needs to be displayed in the head-mounted device, generating information to be displayed; and Step B20, sending the information to be displayed to the headset device, to make the headset device output the information to be displayed after the headset device sends the information to be displayed to the head-mounted device.

For the specific implementation of steps B10-B20 in this embodiment, reference can be made to the specific implementation of steps S10-S20 in the above-mentioned embodiment, and will not be repeated here.

Figure 8:
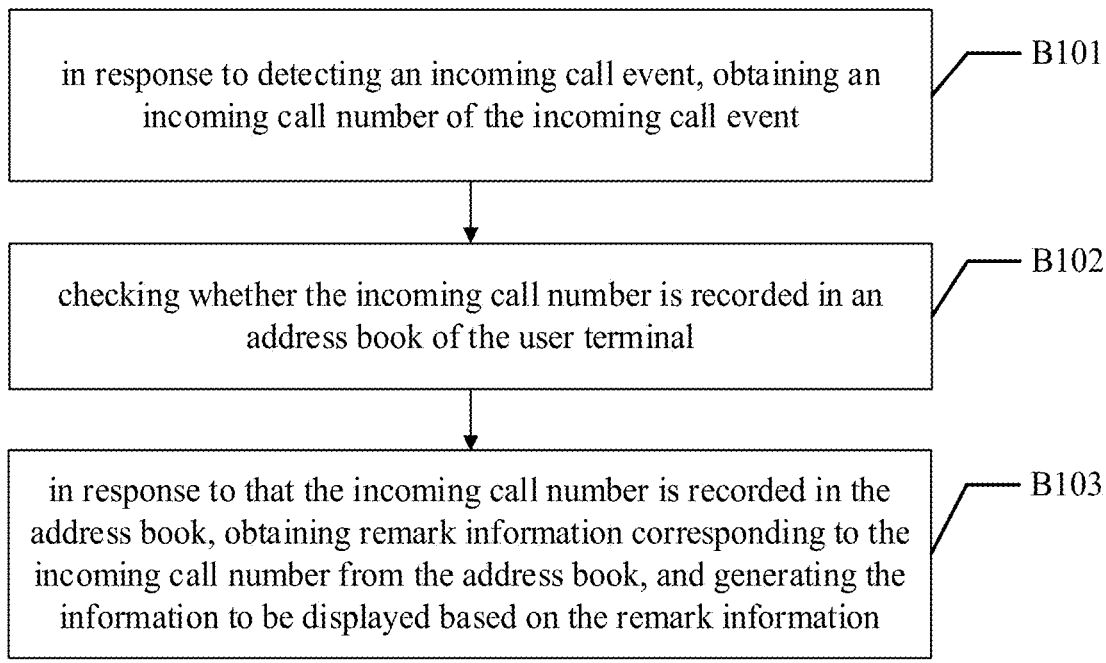
FIG. 8 is a schematic flowchart of an information display method according to an embodiment of the present application.

Further, in an embodiment, as shown in FIG. 8, the step B10 includes:

Step B101, in response to detecting an incoming call event, obtaining an incoming call number of the incoming call event.

When the user terminal detects the incoming call event, it means that the user terminal needs to display information in the head-mounted device. At this time, the user terminal can obtain the incoming call number of the incoming call event.

In an embodiment, the user terminal can directly use the obtained incoming call number as the information to be displayed.

Step B102, checking whether the incoming call number is recorded in an address book of the user terminal.

In another embodiment, after the user terminal obtains the incoming call number of the incoming call event, it first searches whether the incoming call number is recorded in the address book of the user terminal to determine whether the incoming call number is from an acquaintance.

Step B103, in response to that the incoming call number is recorded in the address book, obtaining remark information corresponding to the incoming call number from the address book, and generating the information to be displayed based on the remark information.

If the incoming call number of this incoming call event is recorded in the address book, it means that this incoming call event is a call from an acquaintance. At this time, the user terminal can further obtain the remark information corresponding to the incoming call number from the address book, and generate information to be displayed based on the remark information. The remark information refers to the name, nickname and other information that the user has remarked on each phone number in the address book. When the user terminal sends the information to be displayed based on the remark information to the headset device, and then the headset device forwards it to the head-mounted device for display, users can easily learn on the head-mounted device who is calling, thereby improving the user experience of using the head-mounted device while wearing earphones.

Figure 9:
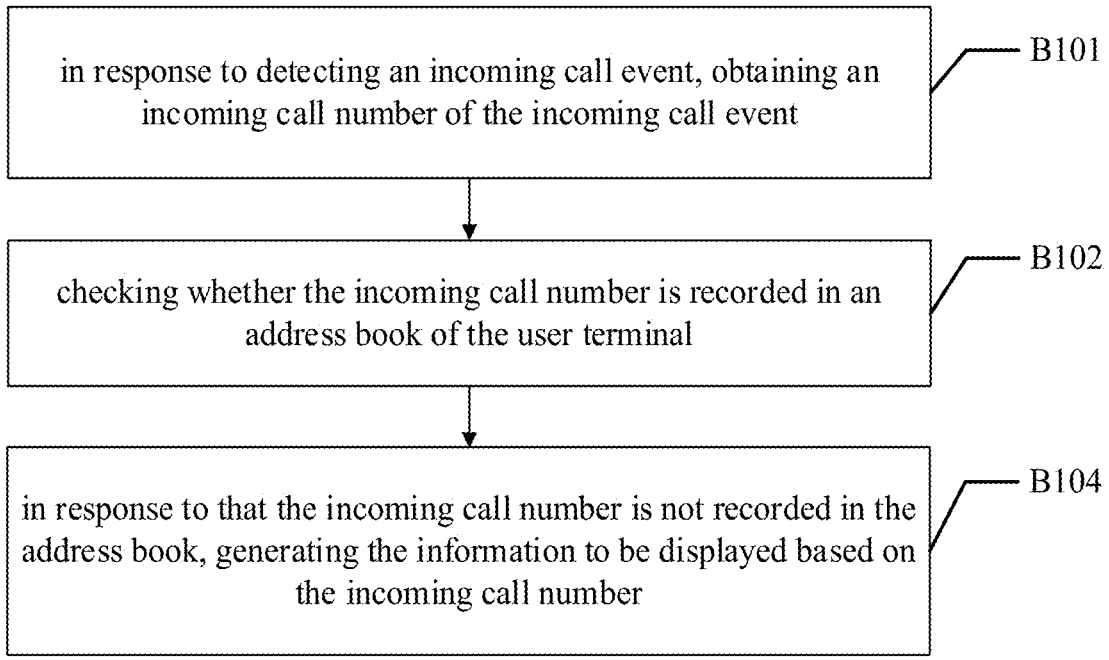
FIG. 9 is a schematic flowchart of an information display method according to an embodiment of the present application.

As shown in FIG. 9, the information display method further includes:

Step B104, in response to that the incoming call number is not recorded in the address book, generating the information to be displayed based on the incoming call number.

If the incoming call number of this incoming call event is not recorded in the address book, it means that this incoming call event is a call from a stranger. At this time, the user terminal can directly generate information to be displayed based on the incoming call number. When the user terminal sends the information to be displayed generated based on the incoming call number to the headset device, and then the headset device forwards it to the head-mounted device for display, users can easily learn on the head-mounted device that the current call is from a stranger, thereby improving the user experience of using the head-mounted device while wearing earphones.

Figure 10:
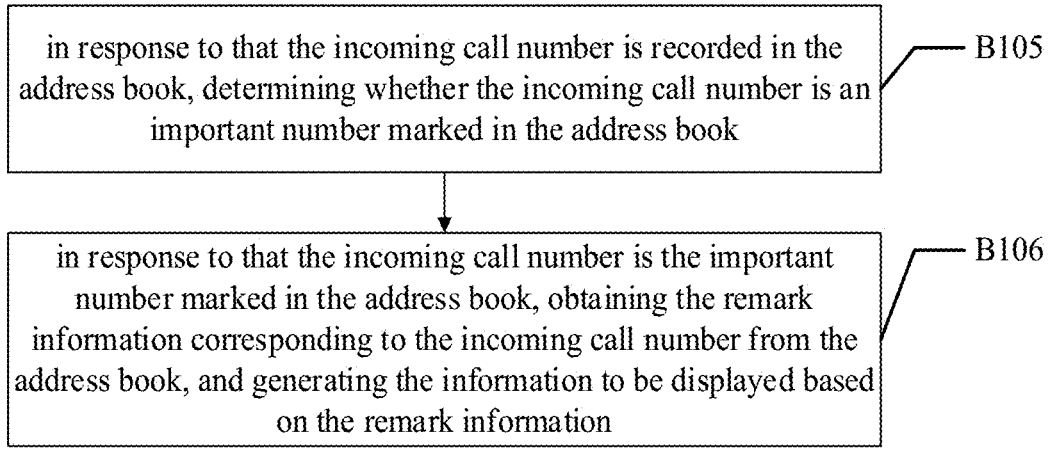
FIG. 10 is a schematic flowchart of an information display method according to an embodiment of the present application.

Further, in an embodiment, before the step B103, as shown in FIG. 10, the information display method further includes:

Step B105, in response to that the incoming call number is recorded in the address book, determining whether the incoming call number is an important number marked in the address book.

If the incoming call number is recorded in the address book, the user terminal can further determine whether the incoming call number is an important number marked in the address book. The important number can be pre-marked in the address book, indicating that the user wants a reminder to be displayed in the head-mounted device when a call comes from that number.

Step B106, in response to that the incoming call number is the important number marked in the address book, performing the step B103.

If the user terminal determines that the incoming call number is an important number marked in the address book, it can generate information to be displayed based on the remark information. When the user terminal sends the information to be displayed based on the remark information to the headset device, and then the headset device forwards it to the head-mounted device for display, users can easily learn on the head-mounted device that the current incoming call is an important number, thereby improving the user experience of using the head-mounted device while wearing earphones.

Further, if the incoming call number is not an important number marked in the address book, no prompt is required to avoid being disturbed by incoming calls that the user considers unimportant when using the head-mounted device.

Besides, embodiments of the present application further provide an information display device. In this embodiment, the information display device can be a headset device, and the headset device can include a structural housing, a main control module, a memory, etc. The headset device communicates with the user terminal and the head-mounted device respectively through the Bluetooth multi-point connection function. The main control module can include a microprocessor, an audio decoding unit, a power supply and a power management unit, sensors required by the system and other active or passive components, etc. (which can be replaced, deleted or added according to actual functions) to realize wireless audio reception and playback functions. The memory of the earphone box can store an information display program, and the microprocessor can call the information display program stored in the memory and perform the following operations:

receiving information to be displayed sent by the user terminal, where the information to be displayed is generated by the user terminal when it detects that information needs to be displayed in the headset device and is sent to the headset device; and sending the information to be displayed to the head-mounted device, to make the head-mounted device output and display the information to be displayed.

Further, after sending the information to be displayed to the head-mounted device, the microprocessor can call the information display program stored in the memory and perform the following operations:

in response to detecting a first feedback instruction for the information to be displayed triggered in the headset device, sending the first feedback instruction to the user terminal, to make the user terminal respond to the first feedback instruction.

Further, after sending the information to be displayed to the head-mounted device, the microprocessor can call the information display program stored in the memory and perform the following operations:

in response to receiving a second feedback instruction sent by the head-mounted device, forwarding the second feedback instruction to the user terminal, to make the user terminal respond to the second feedback instruction, where the second feedback instruction is a feedback instruction for the information to be displayed that is triggered in the head-mounted device upon detection by the head-mounted device.

Further, after sending the information to be displayed to the head-mounted device, the microprocessor can call the information display program stored in the memory and perform the following operations:

in response to detecting a tapping operation on a housing of the headset device, triggering a third feedback instruction for the information to be displayed; and sending the third feedback instruction to the head-mounted device, so that the head-mounted device responds to the third feedback instruction to perform an operation of stopping displaying the information to be displayed or to perform a page turning operation for the information to be displayed.

Besides, embodiments of the present application further provide an information display device. In this embodiment, the information display device can be a head-mounted device. The head-mounted device can include a structural housing, a main control module, a memory, etc. The headset device communicates with the user terminal and the head-mounted device respectively through the Bluetooth multi-point connection function. The main control module can include a microprocessor, an audio decoding unit, a power supply and power management unit, sensors required by the system and other active or passive components, etc. (which can be replaced, deleted or added according to actual functions) to realize wireless audio reception and playback functions. An information display program can be stored in the memory of the first earphone, and the microprocessor can call the information display program stored in the memory and perform the following operations:

receiving information to be displayed sent by the headset device, where the information to be displayed is generated by the user terminal when it detects that information needs to be displayed in the headset device and is sent to the headset device; and outputting and displaying the information to be displayed.

Further, after outputting and displaying the information to be displayed, the microprocessor can also call the information display program stored in the memory and perform the following operations:

in response to detecting a second feedback instruction for the information to be displayed triggered in the head-mounted device, sending the second feedback instruction to the headset device, to make the user terminal respond to the second feedback instruction forwarded by the headset device.

Besides, embodiments of the present application further provide an information display device. In this embodiment, the information display device can be a user terminal. The user terminal can include a structural housing, a main control module, a memory, etc. The headset device communicates with the user terminal and the head-mounted device respectively through the Bluetooth multi-point connection function. The main control module can include a microprocessor, an audio decoding unit, a power supply and power management unit, sensors required by the system and other active or passive components, etc. (which can be replaced, deleted or added according to actual functions) to realize wireless audio reception and playback functions. An information display program can be stored in the memory of the first earphone, and the microprocessor can call the information display program stored in the memory and perform the following operations:

in response to detecting that information needs to be displayed in the head-mounted device, generating information to be displayed; and sending the information to be displayed to the headset device, to make the headset device output the information to be displayed after the headset device sends the information to be displayed to the head-mounted device.

Further, the in response to detecting that information needs to be displayed in the head-mounted device, generating information to be displayed includes:

in response to detecting an incoming call event, obtaining an incoming call number of the incoming call event;

checking whether the incoming call number is recorded in an address book of the user terminal;

in response to that the incoming call number is recorded in the address book, obtaining remark information corresponding to the incoming call number from the address book, and generating the information to be displayed based on the remark information; or in response to that the incoming call number is not recorded in the address book, generating the information to be displayed based on the incoming call number.

Further, before obtaining the remark information corresponding to the incoming call number from the address book, and generating the information to be displayed based on the remark information, the microprocessor can also call the information display program stored in the memory and perform the following operations:

in response to that the incoming call number is recorded in the address book, determining whether the incoming call number is an important number marked in the address book;

in response to that the incoming call number is the important number marked in the address book, obtaining the remark information corresponding to the incoming call number from the address book, and generating the information to be displayed based on the remark information.

In addition, embodiments of the present application further provide a computer-readable storage medium. An information display program is stored in the storage medium, and when the information display program is executed by the processor, the steps of the information display method as described above are implemented.

For various embodiments of the information display device and the computer-readable storage medium of the present application, reference can be made to the various embodiments of the information display method of the present application, which will not be described again here.

It should be noted that in this document, the terms "comprise", "include" or any other variants thereof are intended to cover a non-exclusive inclusion. Thus, a process, method, article, or device that includes a series of elements not only includes those elements, but also includes other elements that are not explicitly listed, or also includes elements inherent to the process, method, article, or device. If there are no more restrictions, the element defined by the sentence "including a . . . " does not exclude the existence of other identical elements in the process, method, article or device that includes the element.

The serial numbers of the foregoing embodiments of the present application are only for description, and do not represent the advantages and disadvantages of the embodiments.

Through the description of the above embodiment, those skilled in the art can clearly understand that the above-mentioned embodiments can be implemented by software plus a necessary general hardware platform, of course, it can also be implemented by hardware, but in many cases the former is a better implementation. Based on this understanding, the technical solution of the present application can be embodied in the form of software product in essence or the part that contributes to the existing technology. The computer software product is stored on a storage medium (such as ROM/RAM, magnetic disk, optical disk) as described above, including several instructions to cause a terminal device (which can be a mobile phone, a computer, a server, an air conditioner, or a network device, etc.) to execute the method described in each embodiment of the present application.

The above are only some embodiments of the present application, and do not limit the scope of the present application thereto. Under the concept of the present application, equivalent structural transformations made according to the description and drawings of the present application, or direct/indirect application in other related technical fields are included in the scope of the present application.

What is claimed is:

1. An information display method, wherein the method is applied to a headset device, the headset device communicates with a user terminal and a head-mounted device respectively through a Bluetooth multi-point connection function, and the method comprises:

receiving information to be displayed sent by the user terminal, wherein in response to the user terminal detecting an incoming call event, an incoming call number of the incoming call event being recorded in an address book of the user terminal, and the incoming call number being marked as an important number, the information to be displayed is generated according to remark information corresponding to the incoming call number, and is sent to the headset device; and sending the information to be displayed to the head-mounted device, to make the head-mounted device output and display the information to be displayed.

2. The information display method according to claim 1, wherein after sending the information to be displayed to the head-mounted device, the information display method further comprises:

in response to detecting a first feedback instruction for the information to be displayed triggered in the headset device, sending the first feedback instruction to the user terminal, to make the user terminal respond to the first feedback instruction.

3. The information display method according to claim 1, wherein after sending the information to be displayed to the head-mounted device, the information display method further comprises:

in response to receiving a second feedback instruction sent by the head-mounted device, forwarding the second feedback instruction to the user terminal, to make the user terminal respond to the second feedback instruction, wherein the second feedback instruction is a feedback instruction for the information to be displayed that is triggered in the head-mounted device upon detection by the head-mounted device.

4. The information display method according to claim 1, wherein after sending the information to be displayed to the head-mounted device, the information display method further comprises:

in response to detecting a tapping operation on a housing of the headset device, triggering a third feedback instruction for the information to be displayed; and sending the third feedback instruction to the head-mounted device, so that the head-mounted device responds to the third feedback instruction to perform an operation of stopping displaying the information to be displayed or to perform a page turning operation for the information to be displayed.

5. A non-transitory computer-readable storage medium, wherein an information display program is stored in the non-transitory computer-readable storage medium, and when the information display program is executed by a processor, the information display method according to claim 1 is implemented.

6. An information display method, wherein the method is applied to a head-mounted device, a headset device communicates with a user terminal and the head-mounted device respectively through a Bluetooth multi-point connection function, and the method comprises:

receiving information to be displayed sent by the headset device, wherein in response to the user terminal detecting an incoming call event, an incoming call number of the incoming call event being recorded in an address book of the user terminal, and the incoming call number being marked as an important number, the information to be displayed is generated according to remark information corresponding to the incoming call number, and is sent to the headset device; and outputting and displaying the information to be displayed.

7. The information display method according to claim 6, wherein after outputting and displaying the information to be displayed, the information display method further comprises:

in response to detecting a second feedback instruction for the information to be displayed triggered in the head-mounted device, sending the second feedback instruction to the headset device, to make the user terminal respond to the second feedback instruction forwarded by the headset device.

8. A non-transitory computer-readable storage medium, wherein an information display program is stored in the non-transitory computer-readable storage medium, and when the information display program is executed by a processor, the information display method according to claim 6 is implemented.

9. An information display method, wherein the method is applied to a user terminal, a headset device communicates with the user terminal and a head-mounted device respectively through a Bluetooth multi-point connection function, and the method comprises:

in response to detecting an incoming call event, obtaining an incoming call number of the incoming call event;

checking whether the incoming call number is recorded in an address book of the user terminal;

in response to that the incoming call number is recorded in the address book, determining whether the incoming call number is an important number recorded in the address book;

in response to that the incoming call number is an important number recorded in the address book, obtaining remark information corresponding to the incoming call number from the address book, and generating the information to be displayed based on the remark information; and sending the information to be displayed to the headset device, to make the headset device output the information to be displayed after the headset device sends the information to be displayed to the head-mounted device.

10. The information display method according to claim 9, wherein after checking whether the incoming call number is recorded in the address book of the user terminal, the information display method further comprises:

in response to that the incoming call number is not recorded in the address book, generating the information to be displayed based on the incoming call number.

11. A non-transitory computer-readable storage medium, wherein an information display program is stored in the non-transitory computer-readable storage medium, and when the information display program is executed by a processor, the information display method according to claim 9 is implemented.

* * * * *